US009703678B2

(12) United States Patent
Stall et al.

(10) Patent No.: US 9,703,678 B2
(45) Date of Patent: Jul. 11, 2017

(54) DEBUGGING PIPELINE FOR DEBUGGING CODE

(75) Inventors: Jonathon Michael Stall, Bothell, WA (US); Brian R. Crawford, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 791 days.

(21) Appl. No.: 12/342,876

(22) Filed: Dec. 23, 2008

(65) Prior Publication Data

US 2010/0162212 A1 Jun. 24, 2010

(51) Int. Cl.
G06F 11/36 (2006.01)
(52) U.S. Cl.
CPC ................................ *G06F 11/3664* (2013.01)
(58) Field of Classification Search
USPC .......................................................... 717/124
See application file for complete search history.

(56) References Cited

U.S. PATENT DOCUMENTS

| | | | | |
|---|---|---|---|---|
| 5,778,230 | A * | 7/1998 | Wimble et al. | 717/131 |
| 5,892,941 | A * | 4/1999 | Khan et al. | 703/22 |
| 5,901,315 | A | 5/1999 | Edwards et al. | |
| 5,958,049 | A * | 9/1999 | Mealey et al. | 713/1 |
| 6,011,920 | A * | 1/2000 | Edwards et al. | 717/130 |
| 6,119,247 | A * | 9/2000 | House et al. | 714/38.14 |
| 6,126,328 | A | 10/2000 | Mallory et al. | |
| 6,145,093 | A | 11/2000 | Shiga | |
| 6,353,923 | B1 * | 3/2002 | Bogle et al. | 717/128 |
| 6,393,437 | B1 * | 5/2002 | Zinda et al. | 717/124 |
| 6,587,995 | B1 * | 7/2003 | Duboc et al. | G06F 11/26 716/106 |

(Continued)

FOREIGN PATENT DOCUMENTS

| | | |
|---|---|---|
| JP | 7230393 A | 8/1995 |
| JP | 0883196 A | 3/1996 |
| JP | 2008217545 A | 9/2008 |

OTHER PUBLICATIONS

"Serializing Objects." Msdn.microsoft.com. Microsoft, n.d. Web. Jul. 24, 2013.*

(Continued)

*Primary Examiner* — Chameli Das
*Assistant Examiner* — Joanne Macasiano
(74) *Attorney, Agent, or Firm* — Ogilvie Law Firm (57) ABSTRACT

A debugging pipeline may be developed to create a debugging experience for computer code operating in an execution environment, using a debugging tool outside of the execution environment. A producer can publish a debugging pipeline, configured to link the producer to a consumer (e.g., a debugging tool) by exposing a debugging pipeline interface object to a consumer. The debugging pipeline can implement a set of debugging protocols, comprising: protocol for processing of debugging requests for computer code in at least one of at least two computer languages; a protocol configured for processing of computer code language types in respective signatures without exposing operating system specific constructs; and a protocol for a first debugging pipeline to be isolated from one or more second debugging pipelines. Additionally, a consumer component can provide debugging of the computer code in the execution environment.

20 Claims, 7 Drawing Sheets

(56) References Cited

U.S. PATENT DOCUMENTS

| | | | | |
|---|---|---|---|---|
| 6,671,825 | B1* | 12/2003 | Joshi et al. | G06F 11/36 714/38.11 |
| 6,718,294 | B1 | 4/2004 | Bortfeld | |
| 6,826,746 | B2 | 11/2004 | Evans et al. | |
| 7,331,049 | B1* | 2/2008 | Jin | 719/314 |
| 7,418,697 | B2 | 8/2008 | Gryko et al. | |
| 8,006,232 | B1* | 8/2011 | Rideout et al. | 717/124 |
| 2003/0028858 | A1* | 2/2003 | Hines | 717/125 |
| 2003/0037225 | A1* | 2/2003 | Deng et al. | 712/227 |
| 2004/0010778 | A1* | 1/2004 | Kaler et al. | 717/130 |
| 2004/0230955 | A1* | 11/2004 | Pugh et al. | 717/124 |
| 2004/0243979 | A1 | 12/2004 | Pugh et al. | |
| 2006/0143531 | A1* | 6/2006 | Kilian | G06F 11/3648 714/38.14 |
| 2006/0294424 | A1 | 12/2006 | Boyce | |
| 2008/0018652 | A1 | 1/2008 | Toelle et al. | |
| 2008/0195752 | A1 | 8/2008 | Singla et al. | |

OTHER PUBLICATIONS

Bates, Peter. "Debugging heterogeneous distributed systems using event-based models of behavior." ACM Transactions on Computer Systems (TOCS) 13.1, Feb. 1995, pp. 1-31.*
Goldszmidt et al., "Interactive blackbox debugging for concurrent languages", PADD '88 Proceedings of the 1988 ACM SIGPLAN and SIGOPS, ACM, May 1988, pp. 271-282.*
"Geospatial Scripting: Pipeline Programming Basics", http://www.microimages.com/documentation/cplates/74ProgPipeline.pdf, Feb. 2008.
"Why you can't debug mscorwks when interop-debugging", http://blogs.msdn.com/jmstall/archive/2005/03/15/395680.aspx.
"Working on managed wrappers for Native Debugging API", http://blogs.msdn.com/jmstall/archive/2006/07/05/managed-wrappers-for-native-debug-api.aspx.
"International Search Report", Mailed Date: Jul. 22, 2010, Application No. PCT/US2009/067785, Filed Date: Dec. 11, 2009, pp. 9.
Reply second Chinese Office Action cited in Chinese Application No. 200980152909.6 dated May 29, 2013, 10 pgs.
Second Chinese Office Action cited in Chinese Application No. 200980152909.6 dated Mar. 25, 2013, 6 pgs.
Int. Preliminary Report cited in PCT Application No. PCT/US2009/067785 dated Jun. 29, 2011, 5 pgs.
First Chinese Office Action cited in Chinese Application No. 200980152909.6 dated Jul. 31, 2012, 11 pgs.
Reply first Chinese Office Action cited in Chinese Application No. 200980152909.6 dated Dec. 12, 2012, 25 pgs.
Japanese Office Action cited in Japanese Application No. 2011-543561 dated Oct. 15, 2013, 4 pgs.
Chinese Notice of Allowance cited in Chinese Application No. 200980152909.6 dated Jun. 26, 2013, 14 pgs.
Japanese Office Action cited in Japanese Application No. 2011-543561 dated May 30, 2014, 2 pgs.
"Supplementary Search Report Issued in European Patent Application No. 09835542.3", Mailed Date: Mar. 31, 2016, 9 Pages.
Cheng, et al., "A Portable Debugger for Parallel and Distributed Programs", In Proceedings of Supercomputing, Nov. 14, 1994, pp. 723-732.
"Office Action Received in Korean Patent Application No. 10-2011-7013798", Mailed Date: Nov. 19, 2015, 10 Pages.
"Office Action Issued in Canadian Patent Application No. 2744216", Mailed Date: Dec. 22, 2015, 5 Pages.
"Office Action Issued in Canada Patent Application No. 2744216", Mailed Date: Sep. 19, 2016, 3 Pages.

* cited by examiner

DEBUGGING PIPELINE FOR DEBUGGING CODE

BACKGROUND

Computer code can be executed in a variety of environments, for example, script code executed by an interpreter, programming code executed in a runtime environment, and many others. Further, debugging of computer code can be performed in a variety of ways, using a variety of platforms and protocols. Often, a user may utilize an application development and execution framework to develop code, which may also comprise a debugging tool for debugging the code. In the alternate, debugging tools can be separate components that have been designed to work with a particular computer language in a particular programming or execution environment. Additionally, debugging can be performed during execution, or using a log file created from the code execution.

Users and developers of computer program applications often find a need to debug code in the applications. For example, a developer of a macro that is designed to be run in a host application may wish to debug the code before release or use. Performing debugging tasks may be supported by a host application's execution environment, but users may wish to utilize debugging tools outside the execution environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While debugging tools may provide debugging for computer code (e.g., script code, programming language code, intermediate language code, and machine-language code) they are typically limited to operating with a particular type of code or language, and/or a particular platform. Often, users of a host application may develop code to be run in the host application, such as a macro, and may wish to debug the developed code. Existing debugging application programming interfaces (APIs) usually require a custom solution for respective debugging scenarios, making it difficult to address various scenarios, for example, that a business application may encounter. There are currently no standardized solutions for debugging across platforms, operating systems, and languages.

One or more techniques and/or systems are provided herein for facilitating debugging of computer code by debugging tools that may be outside of the execution environment of the host application, and may comprise functionality that applies to a different platform than that of the host application. For example, where computer code may reside within an execution environment for compiling and executing the host application for the developed code, the techniques and systems, provided herein, may allow debugging of the computer code using a debugging tool that is proprietary to a different execution environment.

In one embodiment, a system may be devised for facilitating debugging of computer code, hosted in an execution environment, by a debugging tool hosted outside of the execution environment. In an execution environment, a producer (e.g., a browser running a script code engine) can publish a debugging pipeline, which implements a set of debugging protocols to provide for debugging of the computer code in the execution environment. For example, a user may write script code to be compiled and executed by a script engine, which can publish the pipeline to implement a set of debugging protocols for the user code.

Further, in this embodiment, the debugging pipeline may use an interface object to expose the debugging pipeline to a consumer outside the execution environment. The consumer (e.g., a debugging tool), outside the execution environment of the producer, can use the debugging pipeline to provide for debugging of computer code in the execution environment.

Additionally, in this embodiment, the set of protocols can allow the consumer to provide debugging of the computer code. The protocols may include a language agnostic protocol (e.g., independent of particular computing languages) that can provide for language-neutral debugging, allowing debugging requests from a variety of computer languages, for example. Further, the protocols may include an operating system agnostic protocol (e.g., independent of particular operating systems) that can provide for processing of computer code language types in respective signatures without exposing operating system specific constructs. Additionally, the protocols may include an isolation protocol that can provide for multiple debugging pipelines to be isolated from one another.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
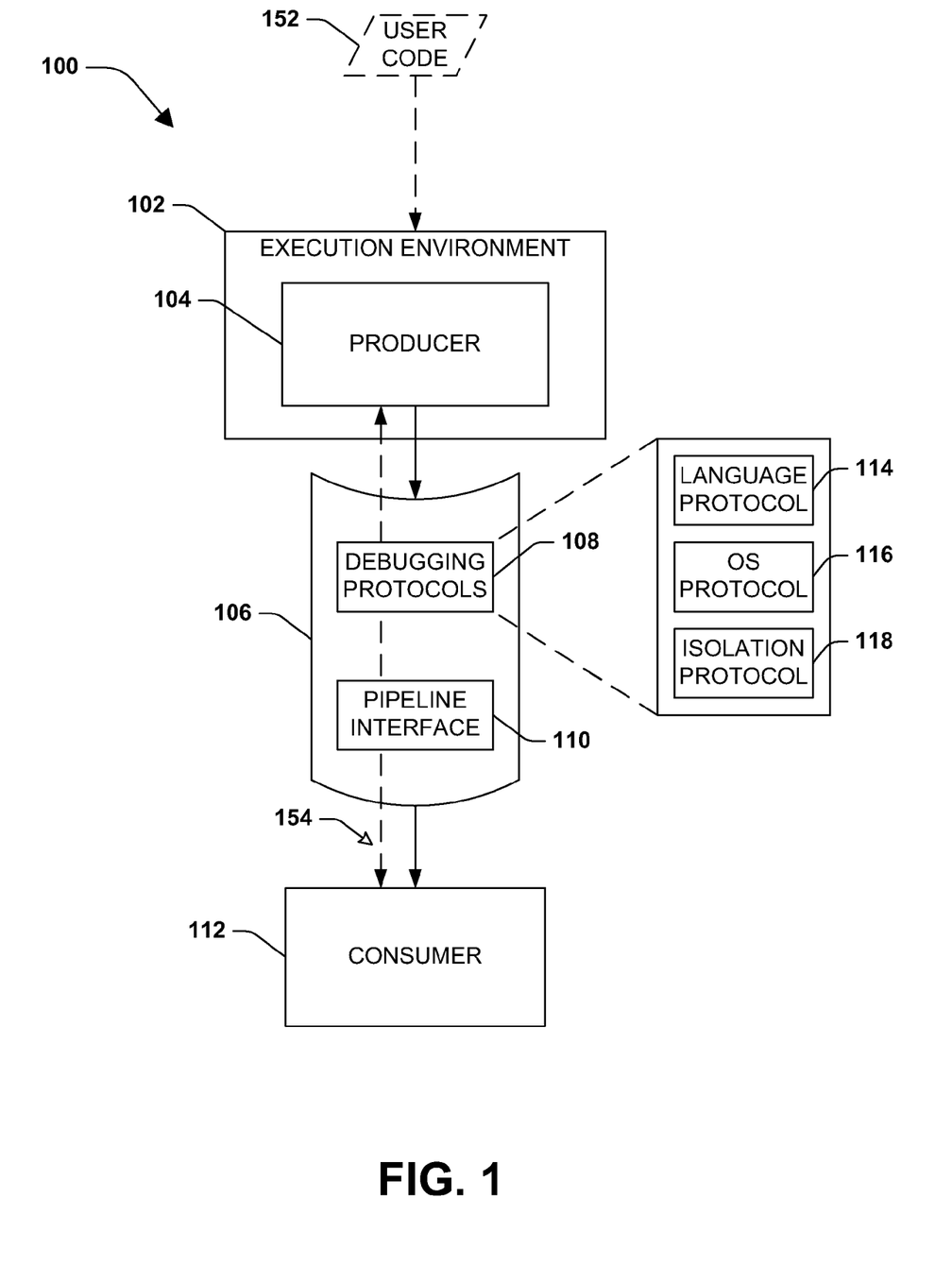
FIG. 1 is a component diagram of an exemplary system for facilitating debugging of computer code, hosted in an execution environment, by a debugging tool hosted outside of the execution environment

FIG. 1 is a component diagram comprising an exemplary system 100 to facilitate debugging of computer code (e.g., user developed script code), hosted in an execution environment, by a debugging tool hosted outside of the execution environment. For example, a user may write script code to be executed by a scripting engine (e.g., a script interpreter that can compile and execute script code at runtime) that is running in a browser (e.g., Internet Explorer). In this embodiment, the exemplary system 100 may be used to facilitate a debugging tool (e.g., a rich client debugger engine, such as an application development platform's debugger) being able to provide for a debugging of the user script code executed by the scripting engine.

It will be appreciated that the computer code hosted in the execution environment is not limited to user developed code. For example, in one embodiment, the computer code may be developed by a script writing engine, and a user, or another machine, may wish to debug the code written by the engine. In another embodiment, a first user may develop the code to be executed in the execution environment, and a second user may wish to debug the user developed code. It is anticipated that those skilled in the art may devise alternate embodiments for using the system described herein. The systems and techniques are not limited to the embodiments described above.

In one embodiment, the computer code may be hosted in an execution environment that is operating in a same process as the debugging tool. For example, a user may write script code for a macro to be executed by a host application, and the exemplary system 100 can facilitate use of a debugger engine, to debug the user script code, from a separate development platform that is running on a same machine. In another embodiment, the execution environment hosting the computer code may be operating on a first remote server, and the debugging tool may be located on a second remote server or the user's machine. In this embodiment, for example, the exemplary system 100 can facilitate remote debugging of the computer code using the debugging tool.

In FIG. 1, the exemplary system comprises a producer component 104, disposed in an execution environment 102. The producer component 104 can be configured to publish a debugging pipeline 106, which can be configured to link stages of a debugging process. For example, the debugging pipeline 106 can be a software infrastructure that links 154 a producer component 104 (e.g., a script code interpreter) with a consumer component 112 (e.g., a debugging tool), to facilitate debugging of user developed code 152.

It will be appreciated that the techniques and systems, described herein, are not limited to those embodiments described above. It is anticipated that those skilled in the art may devise alternate producer components that can function as a computer application or software framework that allows a user to compile and execute developed code, and that the techniques and systems, described herein, include these alternate producer components. For example, adapters, script-code debuggers, application dump-file readers, and other components may be utilized as producer components by the exemplary system 100.

The debugging pipeline 106 comprises a debugging pipeline interface object 110, which can be configured to expose the debugging pipeline 106 to a consumer component 112 outside the execution environment 102. In one embodiment, the producer component 104 can implement the debugging pipeline 106 by making the pipeline interface object 110 available to consumers, and the consumer component 112 can engage the debugging pipeline 106 by utilizing the debugging pipeline interface object 110 to link 154 to the pipeline and function within the pipeline.

For example, in this embodiment, the producer component 104 can publish the debugging pipeline on a system, making the interface object 110 available to a consumer component 112 on that system, such as a rich client development platform (e.g., Visual Studio®). In this example, a user of the rich client development platform may identify which producing components 104 have published pipelines (e.g., by reviewing a list on the system), and engage the debugging pipeline to the rich client development platform by utilizing the pipeline interface object 110. In this way, in this example, the producer can be linked 154 to the debugger by way of the debugging pipeline 106, allowing the rich client debugger to function in the pipeline to provide debugging for the user developed code 152.

Further, the debugging pipeline interface object 110 can be configured to implement a set of debugging protocols 108. The debugging protocols 108 are configured to define a debugging experience of computer code 152 in an execution environment 102 by a consumer component 112 outside the execution environment. For example, the debugging protocols 108 may be configuration files that define the debugging pipeline 106, configuring components linked in the pipeline to operate with particular requirements of the user code 152.

The set of debugging protocols 108 comprises a language agnostic protocol 114 that may be configured to allow processing of debugging requests for computer code in at least one of at least two computer script languages. Implementing the language agnostic protocol 114 (e.g., independent of particular computer languages), in one embodiment, may allow a consumer component to operate at a language semantic level. In this embodiment, the debugging pipeline interface object 110 may comprise an application programming interface (API) that operates at a higher abstraction level than computer languages. For example, where a specific language may use particular code to request a stack frame during debugging, in this embodiment, the API may allow for the debug request to be abstracted to its semantic part (meaning), to "get the stack" and return a "here is the stack" for the request.

The set of debugging protocols 108 further comprises an operating system agnostic protocol 116 (e.g., independent of particular operating systems), which is configured to allow processing of computer code language types in respective signatures without exposing operating system specific constructs. In one embodiment, implementing the operating system agnostic protocol 116 can allow the debugging pipeline 106 to be separated from operating system concepts, such as processes and threads. In this embodiment, the debugging pipeline 106 will not expose operating system constructs, such as process identifiers and operating system handles. For example, a first implementation of a debugging pipeline may provide for debugging of an entire process, while a second implementation of a debugging pipeline may provide for debugging of a single thread, a subset of threads, or a state machine that spawns multiple processes, such as a distributed system.

The set of debugging protocols 108 further comprises an isolation protocol 118, which is configured to provide for a first debugging pipeline to be isolated from one or more second debugging pipelines. In one embodiment, a single debugging pipeline can describe a single-state machine and not have an impact on code that is outside of the intended debugging of the computer code. In this way, for example, a debugging pipeline that is being used to debug user developed code that is running in a host application will not affect other applications running on a machine hosting the user code, and won't affect a host process.

In FIG. 1, the exemplary system 100 further comprises a consumer component 112, which is located outside the execution environment 102 of the producer component 104, and can be configured to provide for debugging 154 of the computer code 152 in the execution environment 102. For example, the consumer component 112 can be a type of tool that provides some form of debugging experience to computer code. In this example, the debugging tool can utilize the pipeline interface 110 (e.g., pick up the interface from a uniform resource locator (URL) and have it wired to a control in the debugging tool) in order to link to the debugging pipeline 106 implemented by the producer component 104, thereby providing for debugging 154 of the computer code 152 using the debugging protocols 108.

In one embodiment, the consumer component 112 may be a debugging tool that is part of a rich client application development platform. As an example, a user of the development platform can "wire up" the debugging tool of the rich client application development platform to the pipeline interface, thereby connecting the debugging tool to the producer 104. In another embodiment, the consumer component 112 may be a browser that comprises a debugging tool. As an example, a user may use the browser to link to the pipeline interface in order to link the debugging tool from the browser with the producer to provide for debugging using the tool.

It will be appreciated that the techniques and systems, described herein, are not limited to those embodiments described above. It is anticipated that those skilled in the art may devise alternate consumer components that can function as debugging tools for the debugging pipeline, and that the techniques and systems, described herein, include these alternate consumer components. For example, command-line shells, automated tools, in-process controls, and other components may be utilized as consumer components by the exemplary system 100.

In one aspect, using a debugging pipeline to link from a component where computer code is can be executed to a debugging tools may allow a variety of processes to become debuggable with a variety of tools. For example, a user may utilize a local browser to access an application running on a cloud server. The cloud application can be a producer by publishing a link in a URL to the pipeline interface, which can be picked up by a browser plug-in control (e.g., by a user of the browser). In this example, using the pipeline, debugging tools associated with the browser plug-in can now query the cloud application for debugging information for the computer code running in the cloud application.

Figure 2:
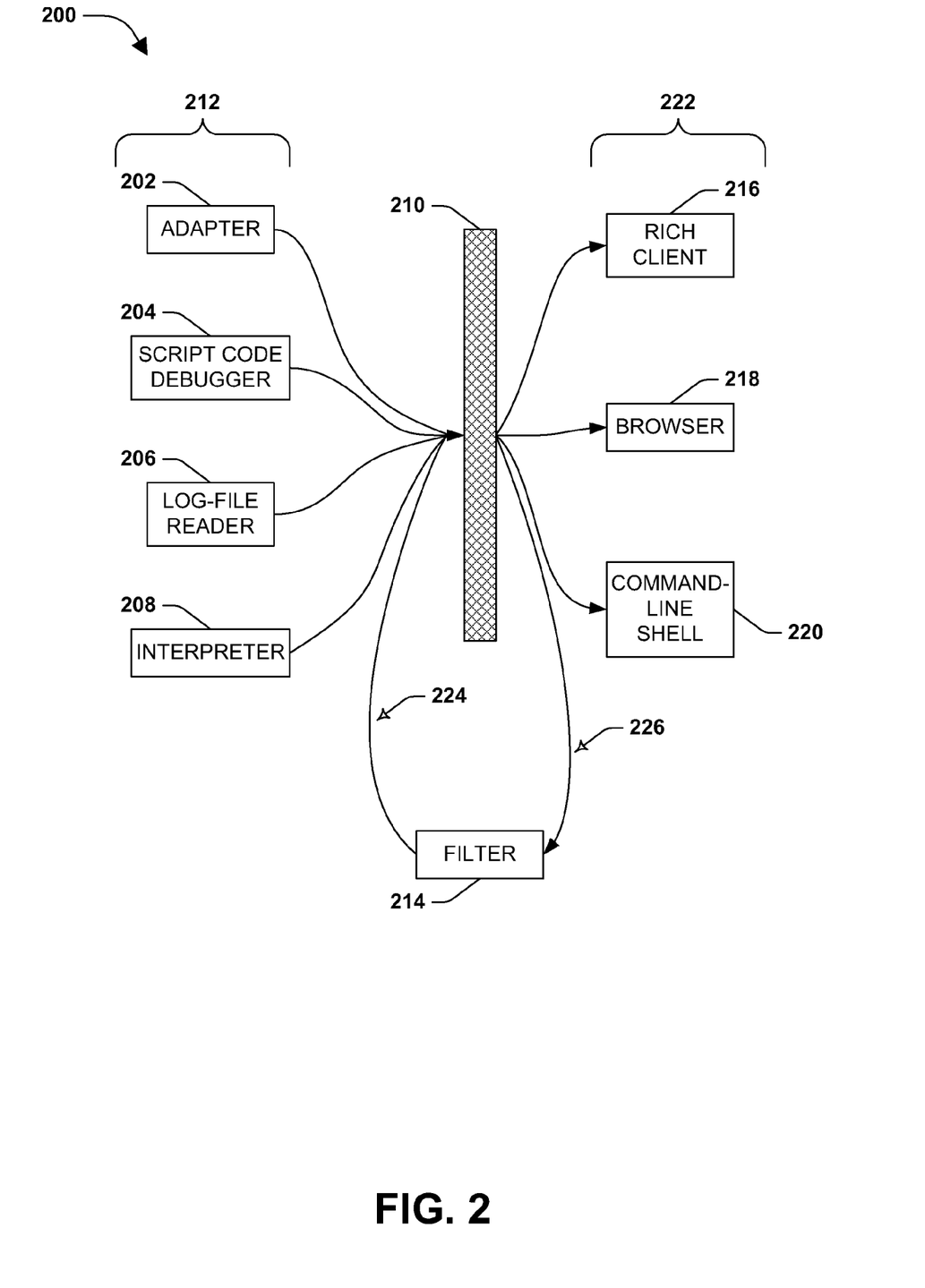
FIG. 2 is a diagram illustrating consumer components implementing a debugging interface to make producer components debuggable for a user.

FIG. 2 is a diagram 200 illustrating how a variety of consumer components 222 may implement the debugging interface 210 associated with a debugging pipeline to make a variety of producer components 212 debuggable for a user. Currently, there are debugging protocols for respective debugging scenarios, for respective proprietary execution platforms, and even for respective computer languages. However, using a debugging pipeline having a debugging interface 210, one may combine components for debugging experiences.

For example, common producer components 212 can include script interpreters 208, which may be implemented in an execution environment for compiling and executing user script code, at runtime. Further, producers 212 can include a log-file reader 206 that a user may use access for debugging after their code has been executed. Additionally, a producer may comprise an adapter 202 over an existing debugging protocol.

Consumer components 222 may be utilized as debugging tools for the producers 212, where they may not have compatible debugging protocols, if the consumer components 222 utilize the published debugging pipeline 210. In one embodiment, the debugging pipeline can be implemented by a producer (e.g., published) with methods (e.g., about thirty methods for C#) that provide consumer component 222 debugging functionality to the producers 212.

For example, a rich client debugging engine 216 (e.g., Visual Studio® debugger) may utilize a debugging interface to link to the debugging pipeline 210. The pipeline 210 may comprise an appropriate number of methods that allow for a rich client debugging engine 216 debugging experience for computer code running in a script interpreter (e.g., JavaScript® interpreter). Further, in another example, a browser-based debugging plug-in 218, or a command-line shell 220 can be linked to the debugging pipeline 210 to provide for debugging of computer code utilized by the producers.

Additionally, a filter component 214 may be applied to transform the debugging pipeline from a first condition to a second condition. For example, a filter 214 may take in 226 a debugging pipeline 210 published by a producer 212, apply a transform to it (e.g., add or remove content), and return a new pipeline implementation 224. From a consumer component standpoint, the filter 214 may be merely another producer, and there may be no difference between getting the pipeline from a producer 212 or from a filter 214. Filters may be utilized for a variety of purposes, for example, for remoting a pipeline to a proxy server, creating a security "read-only" filter, or to remove certain parts of an application from accessibility to a consumer.

In one aspect, the debugging pipeline interface allows one to create filters around a pipeline. In one embodiment, debug objects may not need a backpointer to their parent. This may allow a filter to share debug objects with its original pipeline without having to completely wrap an entire pipeline interface surface, for example. In another embodiment, a filter can create a proxy around respective pieces of data, and forward requests on the proxy to an underlying real object. The proxies can then override desired behaviors, for example, by failing an API that may modify a target, such as a set-value.

Figure 3:
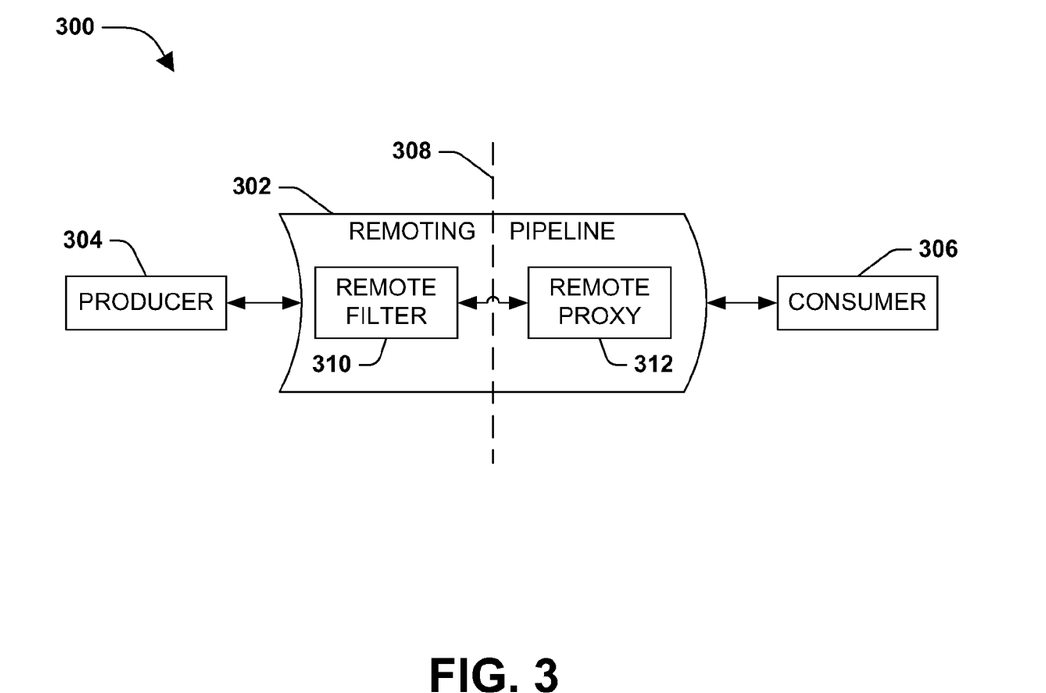
FIG. 3 is an illustration of an example environment where a filter may be used to link remote producers and consumers.

In this aspect, in one embodiment, a pipeline may be remoted using a filter. FIG. 3 is an illustration of an example environment 300 where a filter may be used to link remote producers and consumers. In this example environment, a remoting pipeline 302 may run a customized filter 310 on a producer-side of the pipeline boundary 308. The filter 310 can pre-filter the pipeline before sending data to a remote proxy 312 on a consumer-side of the pipeline boundary 308. For example, the filter 310 may be used to screen out undesired debug events, or handle conditional breakpoints, along with remoting the data to the remote proxy 312.

In the example environment 300, the remote filter 310 consumes a pipeline interface from the producer 304. The filter 310 can use a private remoting protocol with the remote proxy 312 to cross the remoting boundary 308. In one embodiment, the private protocol can be designed to reduce "network chattiness" and cooperate with caching state in the remote proxy 312. For example, "publish" and "connect" functions may be implemented in a remoting filter, which share a private protocol allowing arbitrary eager-fetching and caching. The remote proxy 312 can then expose the pipeline interface to a consumer 306, which may implement the interface in order to function within the debugging pipeline operating within the remoting pipeline 302.

In another aspect, as described above in FIG. 1, the debugging pipeline interface object is configured to implement a set of debugging protocols. The debugging protocols are configured to define a debugging experience of computer code in an execution environment by a consumer component outside the execution environment. The debugging protocols may further comprise a location protocol, which can be configured to provide for locations in the computer code to be referenced during debugging without knowing an underlying debugee operation. For example, the pipeline can operate at a source file abstraction level and provide source file contents without having an explicit symbol concept.

Typically, a compiler knows how source files have been compiled, producing large mapping files, and how a CPU may map back to a source level state, for example. In this example, it may be up to a debugger to find an original source file and do the mapping. In one embodiment, a notion of a "source span" may be utilized for address references. In this embodiment, one can utilize "documents" to refer to a source unit, and "spans" refer to a specific location in a "document."

In this embodiment, "documents" may have their own semantic flags, provide their own contents, and may refer to a location on a disk or in-memory text stream. Further, a "span" can be a common currency with the debugging pipeline interface object (e.g., a pipeline API) to refer to locations of user code. A span can have a backpointer to a file that it is contained in and, given a file, one can look up a span within that file. In this embodiment, a callstack can provide spans and the pipeline can allow enumeration of valid source files. Therefore, for example, a consumer may debug computer code at a source-level without needing to know what an underlying debugee operation is, such as intermediate language code, native code, interpreter state.

Figure 4:
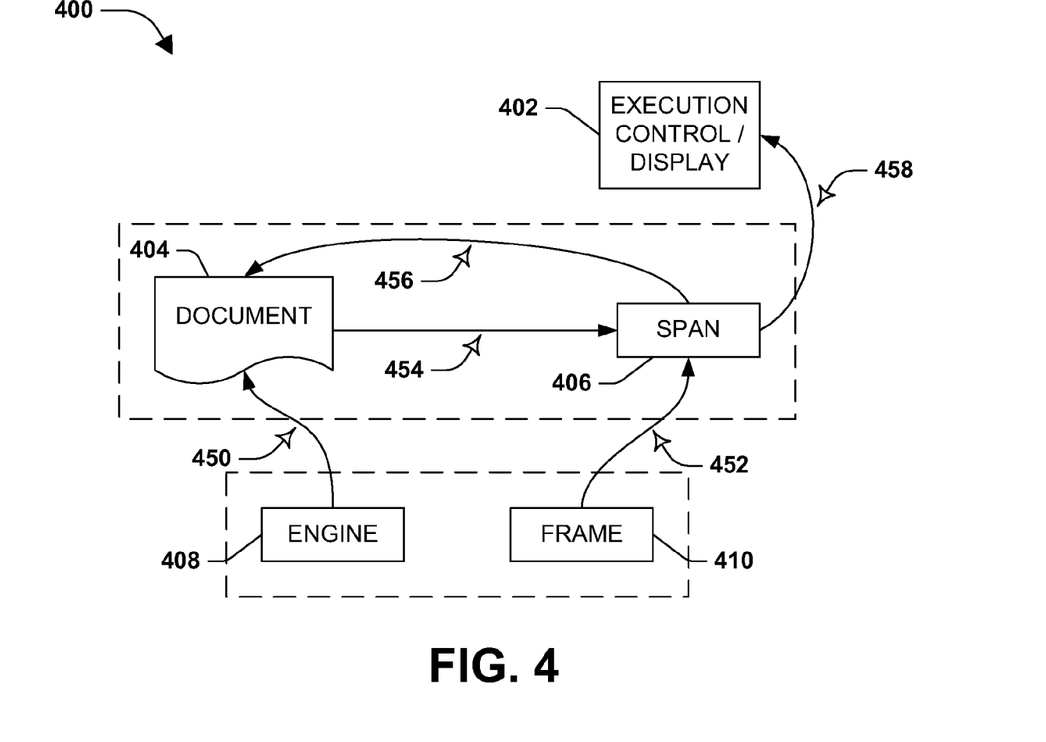
FIG. 4 is a diagram illustrating of an exemplary environment that may implement aspects of the exemplary systems described herein.

FIG. 4 is a diagram illustrating of an exemplary environment 400 that may implement "spans" 406. A hosted control 402 may wish to be able to show a source file, such as while at a breakpoint to highlight a source line that maps to the breakpoint. The debugging pipeline knows that it has hit a breakpoint (e.g., as it caused a debug event), for example, so it knows a thread and can enumerate the frame 410. From the frame 410 one can retrieve 452 a span 406 that tells of a current position in a user code to which the frame 410 corresponds.

In the exemplary environment 400, as described above, the span 406 has a backpointer 456 to a document 404 in which it is located, and also can use it to retrieve document contents 454 at its location in the document. The contents of the document 404 at the location of the span 406 can be shown 458 for the control 402, for example, highlighting a current line in the document for the span 406.

Further, in this exemplary environment 400, a scripting engine 408 may provide functionality for access 450 to respective documents 404 in the user code. For example, a span can be "currency" for referring to locations in the user code. In this embodiment, a span may be self-describing, where it may not need to touch contents of a file to retrieve source information. In one example, this feature may be useful where code is created "on-the-fly" and there may not be a file available to retrieve from.

In this aspect, the debugging protocols may further comprise a type-universe agnostic protocol, which can be configured to allow for a data inspection debugging request to return requested data without exposing a data layout or data type. Current debugging APIs may need a debugger to understand an underlying layout of data and a type-system that describes the data. For example, a typical debugger may need to know that a piece of data is an array type (e.g., as opposed to a primitive or composite type). Further, in this example, the debugger may need to have a rich API to specifically decode through the type universe for the data in user code.

However, in one embodiment, using the type-universe agnostic protocol allows the debugging pipeline interface object (e.g., an interface API) to be more abstract and present data in a self-describing way, without needing a type-universe. For example, respective values that are being inspected can be presented as strings, and enumerate their child values. Therefore, in this example, a data type is not needed as the value is merely a string comprising the value requested for inspection without a data type.

In another aspect, in one embodiment, the debugging pipeline interface object may comprise a debugging tool functions implementor, which can be configured to implement one or more debugging tool functions from the debugging tool for debugging of the computer code in the execution environment. For example, while a consumer component may be a debugging tool, the debugging pipeline interface object can be used to implement the debugging tool's debugging functions for computer code.

In one embodiment, debugging tool functions may comprise those functions typically used by users of a debugging tool, such as function configured to provide a synchronous stream of debugging events; for stopping and resuming a debugee during debugging; for asynchronous stopping events during debugging; for enumerating threads in a state machine; inspecting values; execution control operations; enumerating a thread's callstack; inspecting locals in respective stack frames; fetching of source files; and expression evaluation.

It will be appreciated that the techniques and systems, described herein, are not limited to those debugging functions enumerated above. It is anticipated that those skilled in the art may devise alternate debugging functions for implementation in the debugging pipeline interface object. For example, most debugging tools comprise many more debugging functions than those listed above.

Figure 5:
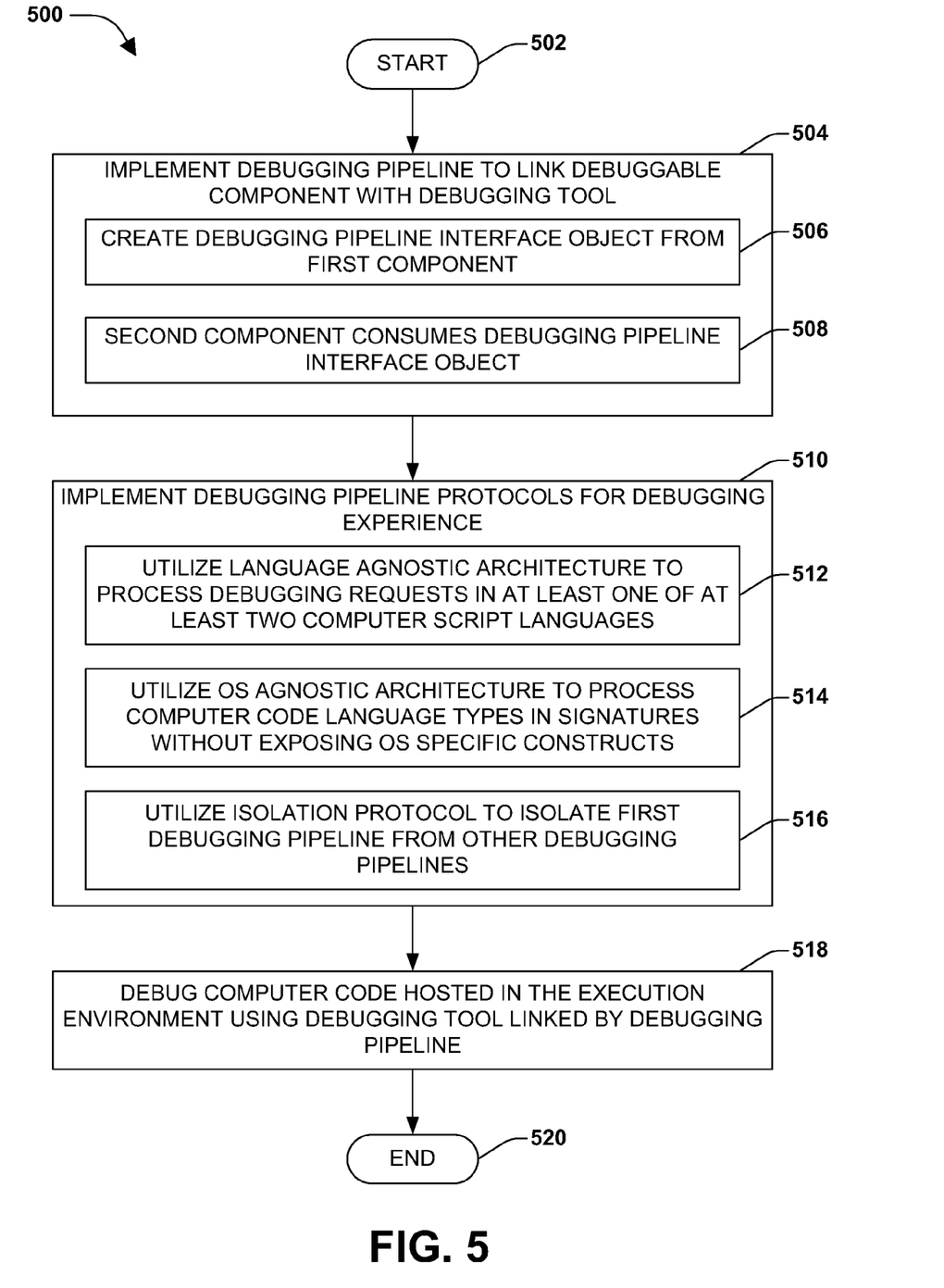
FIG. 5 is a flow diagram of an exemplary method for facilitating debugging of computer code hosted in an execution environment by a debugging tool hosted outside of the execution environment.

A method may be devised where a user may be able to debug computer code, being executed in one environment, using debugging tools from outside that execution environment. FIG. 5 is a flow diagram of an exemplary method 500 for facilitating debugging of computer code hosted in an execution environment by a debugging tool hosted outside of the execution environment. The exemplary method 500 begins at 502 and involves implementing a debugging pipeline that links a component, which a user may wish to be debuggable with a debugging tool, at 504. For example, if a user is executing user developed code in a script interpreter, they may wish to debug the code using a debugging tool that is not available in the current execution environment utilizing the interpreter. In this example, a debugging pipeline can be implemented to link the interpreter to a desired debugging tool.

At 506, implementing a debugging pipeline comprises creating an instance of a debugging pipeline interface object from a first component desired to be debugged (e.g., an execution platform for user developed code). For example, the first component, which a user desires to be debuggable, can publish the pipeline by making an instance of a debugging pipeline interface object available (e.g., make it available via a URL on a webpage). At 508, implementing a debugging pipeline comprises a second component, comprising a desired debugging tool, consuming (e.g., picking the interface up) the debugging pipeline interface object. For example, in order to create a link between the component desired to be debugged and the debugging tool, the debugging tool can pick-up the debugging pipeline interface object from the component desired to be debugged.

In the exemplary method 500, at 510, debugging pipeline protocols for a debugging experience are implemented. For example, in order to provide for debugging of the computer code using the debugging pipeline, particular pipeline protocols are implemented. At 512, a language agnostic architecture is utilized to allow processing of debugging requests for computer code in at least one of at least two computer languages. For example, using this architecture allows debugging of computer code in any of a variety of computer languages and script codes, regardless of a debugging tool linked in the pipeline.

At 514, an operating system agnostic architecture is utilized to allow processing of computer code language types in respective signatures without exposing operating system specific constructs. For example, using this architecture creates an abstraction level above that of the operating system (OS) specific constructs; thereby enabling an OS agnostic approach where a debugging tool that is designed for a particular OS can enable debugging of computer code executed in a different OS.

At 516, an isolation protocol is utilized to provide for a first debugging pipeline to be isolated from one or more second debugging pipelines. For example, isolating one pipeline from another may comprise a single pipeline describing a single-state machine, providing for separate pipelines to remain separated. In this way, in this example, a pipeline may not interfere with code outside the debugging experience.

In the exemplary method 500, at 518, a debugging function is performed in the computer code hosted in the execution environment using the debugging tool linked by the debugging pipeline. For example, once the pipeline is linked between the component that is executing the computer code and a debugging tool outside the execution environment, a user can perform debugging requests on their code using the debugging tool, implementing the debugging protocols in the debugging pipeline.

In one embodiment, filtering may be applied to the debugging pipeline. In this embodiment, filtering may comprise having a filtering component consume the debugging pipeline interface object (e.g., instead of a debugging tool at this point). Once a filter has consumed the debugging pipeline interface object it may apply a transform to the pipeline by changing the pipeline from a first condition to a second condition. For example, a user may wish to allow a second person to perform debugging on some user developed code. In this example, the user may not want the second person to view particular elements of the application, or may not wish for them to make any changes to the code. The user can apply a filter that can transform the pipeline to allow access to merely particular portions of a system, or may merely allow for a "read-only" function.

In this embodiment, after applying a transformation, the filter can expose the transformed debugging pipeline interface object to a consumer component, such as a debugging tool. In this way, a filter component may appear to be merely a debugging pipeline producing component to a consumer of the pipeline. In one example, the filter may be a remoting proxy that can apply a remoting protocol to expose the pipeline interface object to a remote proxy. In this way, in this example, the remote proxy can then expose the pipeline interface object to a consumer component, such as a debugging tool, on the other side of the remoting proxy.

In another aspect, the debugging pipeline may comprise a series of methods that can implement debugging functionality for the debugging tools. For example, some debugging functions that are common to debugging, and can be implemented by the debugging pipeline include providing: a synchronous stream of debugging events; a stopping and resuming of a debugee during debugging; a asynchronous stopping of events during debugging; an inspecting of values; and an execution of control operations. It will be appreciated that many alternate debugging features may be implemented by the debugging pipeline to provide a desired debugging experience, for example, for computer code.

In another aspect, in one embodiment, implementing debugging pipeline protocols may further comprise utilizing a source location agnostic architecture to provide for locations in the computer code to be referenced during debugging without knowing an underlying debugee operation. For example, instead of relying on large mapping files and an underlying source-level state, a debugger may utilize spans to identify code in documents. In this example, a higher level of abstraction allows a span to be self-describing, allowing one to retrieve data from merely a frame, without having to touch contents of source files.

Further, in another embodiment, implementing debugging pipeline protocols may further comprise utilizing a type-universe agnostic architecture to allow for a data inspection debugging request to return requested data without exposing a data layout or data type. In this embodiment, for example, the debugging protocol allows the data to be presented in a self-describing way, without requiring knowledge of a datatype. In this example, a request for data in a location can return that data as a string, without knowing if it is of a certain type.

In another aspect, two or more debugging pipelines can be composed into a single debugging pipeline to present a unified debugging experience for respective pipelines. Composing two of more pipelines can comprise creating a parent pipeline that composes respective features for respective child debugging pipelines. For example, a "Compose( )" function could create a new pipeline implementation (Parent), who's implementation of the debugging pipeline interface object composes respective "child pipelines" for respective debugging features exposed by the interface.

In one embodiment, the Parent can give back a debug event stream, where the Parent could spin up a thread for respective Children, have the Children wait for debug events, and when a Child gets a debug event the Parent can perform an asynchronous break request on the other children, then return the debug events collected from the respective children to the caller of the request. Other embodiments may comprise enumeration of source files or threads, unifying threads and callstacks, and others.

In another aspect, a debugging adapter may be created by instrumenting an existing interpreter with a light-weight application programming interface (API). In one embodiment, an API comprising a few debugging functions may be instrumented into an existing interpreter, to create an adapter that may produce a full debugging pipeline. The functions can include basic debugging features such as stepping between statements, inserting callbacks for tracebacks, and others, and may enable an interpreter to be easily instrumented and get full debugging support through a pipeline consumer that implements the API.

Figure 6:
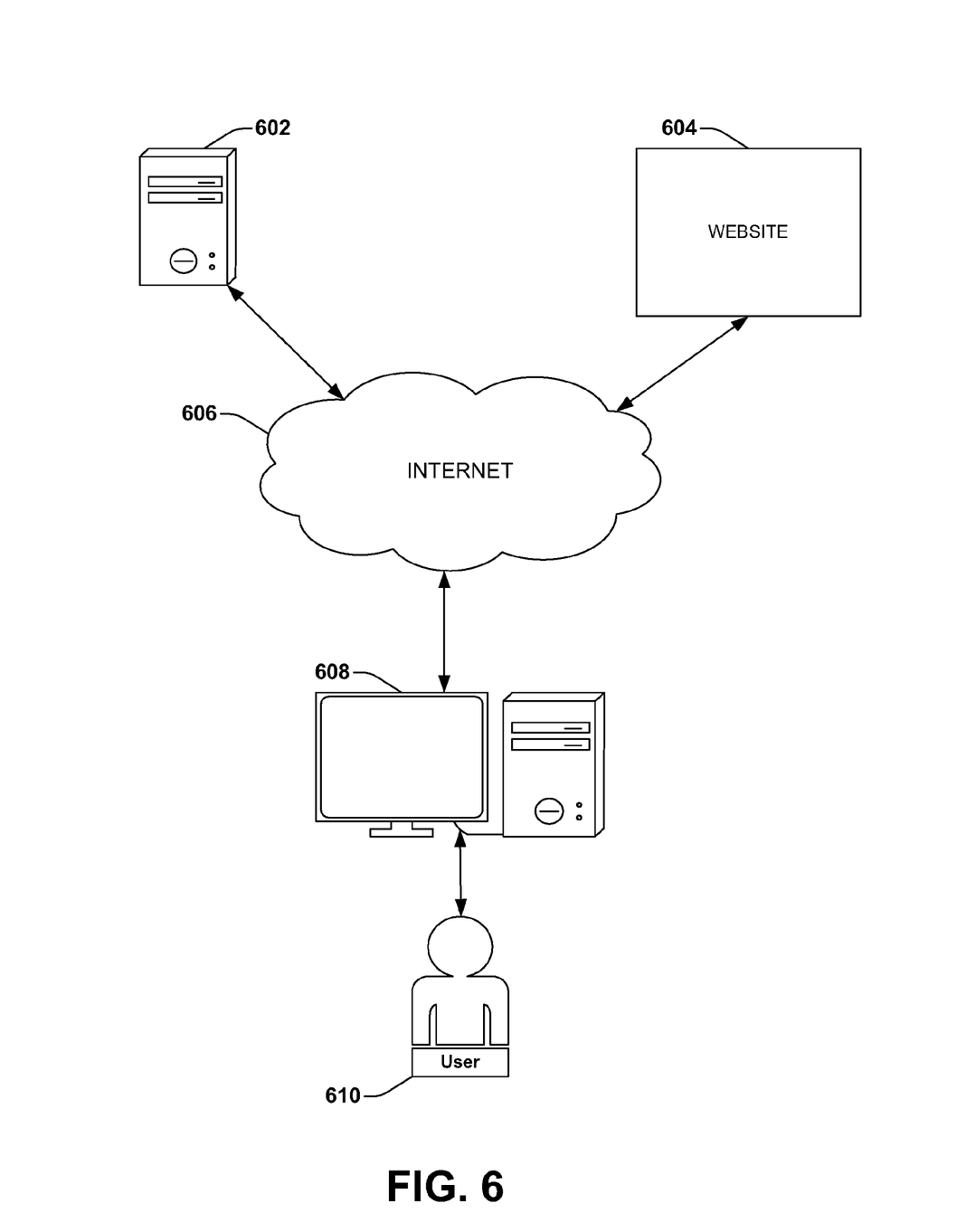
FIG. 6 is an illustration of an exemplary environment where a method for facilitating debugging of computer code hosted in an execution environment by a debugging tool hosted outside of the execution environment may be implemented.

FIG. 6 is an illustration of an exemplary environment 600 where one a method for facilitating debugging of computer code hosted in an execution environment by a debugging tool hosted outside of the execution environment may be implemented. A user 610 may be accessing an application that is hosted on a remote application server 602, using their local machine 608, via the Internet 606. For example, a user 610 may develop a macro to be run in the host application on the remote server 602, and may wish to debug the macro using a debugging tool located on their local machine 608.

In this exemplary environment, the remote application server (e.g., a producer) can publish a debugging pipeline by placing a link to a debugging pipeline interface object on a website 604. A user 610 can then implement the pipeline interface object via the Internet 606 by "wiring up" a control from their debugging tool on their local machine 608 to the interface object located on the website 604. In this way, the user 610 can be provided with debugging tools for their macro running on a remote server 602, using a debugging tool located on their local machine 608.

Figure 7:
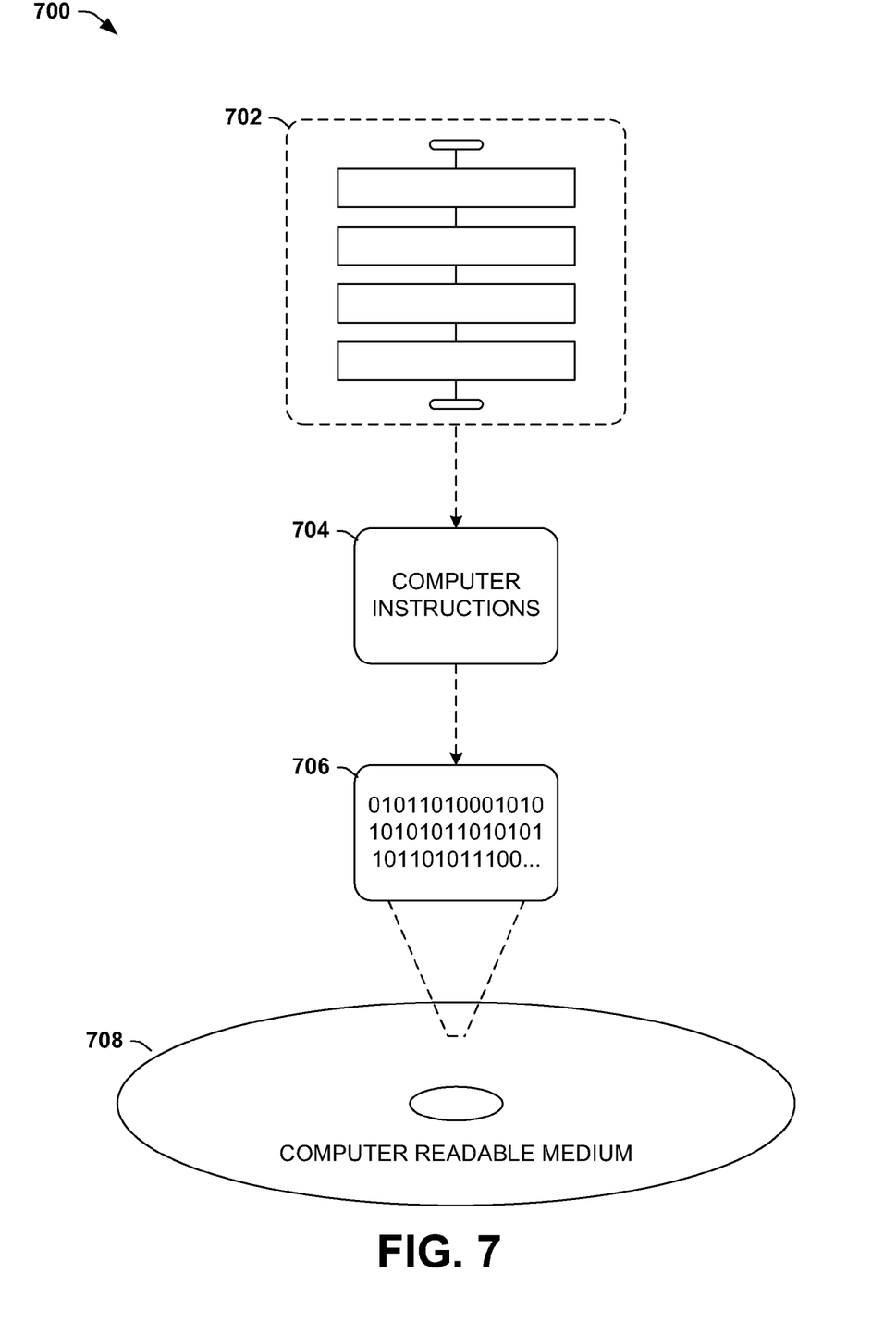
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as the exemplary method 500 of FIG. 5, for example. In another such embodiment, the processor-executable instructions 704 may be configured to implement a system, such as the exemplary system 100 of FIG. 1, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
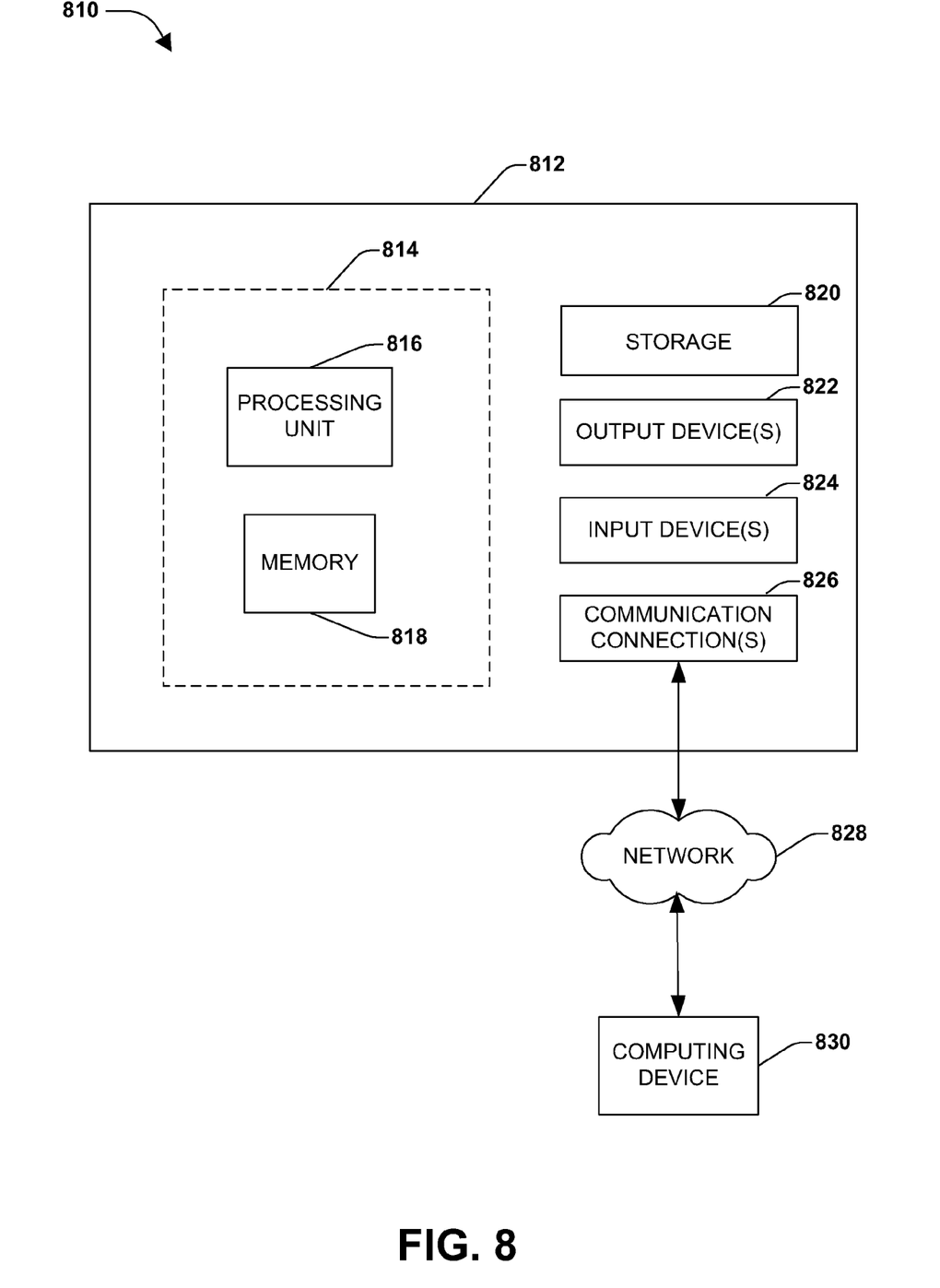
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for debugging cloud application computer code hosted in an execution environment which includes a cloud server, the debugging performed at least in part by a debugging tool hosted outside of the execution environment, the method comprising:

the cloud application publishing a debugging pipeline link in a URL to make an instance of an object of the cloud application computer code available through a debugging pipeline;

responsive to a selection of the instance of the object by at least part of a component comprising the debugging tool hosted outside of the execution environment, linking the object of the cloud application computer code to the debugging tool via the debugging pipeline;

filtering the debugging pipeline using at least one of the following filters: a proxy filter which overrides a behavior, a filter which screens out a debug event, a filter which handles a conditional breakpoint, a filter which uses a private remoting protocol, a filter which limits access to one or more particular portions of a system, a filter which provides read-only access to one or more portions of the cloud application computer code; and implementing one or more protocols within the debugging pipeline to facilitate debugging at least some of the cloud application computer code hosted in the execution environment, the one or more protocols comprising at least one of the following: an isolation protocol configured to provide for the debugging pipeline on a machine to be isolated from a second debugging pipeline on the machine during the debugging, a programming language agnostic protocol which supports debugging requests from a variety of computer languages, a location protocol which allows locations in the cloud application computer code to be referenced during debugging without knowing an underlying debugee operation or explicit symbol, type-universe agnostic protocol which allows a data inspection debugging request to return requested data without exposing a data layout or data type, at least some of the method implemented via a processing unit.

2. The method of claim 1, the cloud application computer code running in a host application.

3. The method of claim 2, the debugging pipeline not affecting an application running on a same machine hosting the cloud application computer code that is running in the host application.

4. The method of claim 2, the debugging pipeline not affecting a host process running on a same machine hosting the cloud application computer code that is running in the host application.

5. The method of claim 1, comprising implementing a type-universe agnostic architecture to facilitate the debugging.

6. The method of claim 1, comprising using at least two of the filters.

7. The method of claim 1, the debugging tool comprising at least one of a rich client, a browser, or a command line shell.

8. A system, comprising:
one or more processing units; and
memory comprising instructions that when executed by at least one of the one or more processing units implement a method for debugging cloud computer code hosted in an execution environment which includes a cloud server by a debugging tool hosted outside of the execution environment, comprising:
publishing a debugging pipeline to make an instance of an object of the cloud computer code available;
responsive to a selection of the instance of the object by at least part of a component comprising the debugging tool hosted outside of the cloud server of the execution environment, linking the object of the cloud computer code to the debugging tool via the debugging pipeline;
filtering the debugging pipeline to generate a filtered debugging pipeline by using at least one of the following filters: a proxy filter which overrides a behavior, a filter which screens out a debug event, a filter which handles a conditional breakpoint, a filter which uses a private remoting protocol, a filter which limits access to one or more particular portions of a system, a filter which provides read-only access to a number of portions of the cloud computer code; and implementing one or more protocols within the filtered debugging pipeline to facilitate debugging at least some of the cloud computer code hosted in the execution environment, the one or more protocols comprising at least one of the following: an isolation protocol configured to provide for the debugging pipeline to be isolated from a second debugging pipeline during the debugging, a programming language agnostic protocol which supports debugging requests from a variety of computer languages, a location protocol which allows locations in the cloud computer code to be referenced during debugging without knowing an underlying debugee operation or explicit symbol, type-universe agnostic protocol which allows a data inspection debugging request to return requested data without exposing a data layout or data type.

9. The system of claim 8, the cloud computer code running in a host application.

10. The system of claim 9, the debugging pipeline not affecting an application running on a same machine hosting the cloud computer code that is running in the host application.

11. The system of claim 9, the debugging pipeline not affecting a host process running on a same machine hosting the cloud computer code that is running in the host application.

12. The system of claim 8, the method comprising implementing a type-universe agnostic architecture to facilitate the debugging.

13. The system of claim 8, the method comprising using at least two of the protocols.

14. The system of claim 8, the debugging tool comprising at least one of a rich client, a browser, or a command line shell.

15. A computer-readable device comprising instructions which when executed perform acts, comprising at least two of the following steps:
utilizing an isolation protocol to provide for a first debugging pipeline on a cloud machine to be isolated from a second debugging pipeline on the cloud machine during a debugging of at least some cloud application computer code, the first debugging pipeline not affecting code outside of the cloud application computer code;
utilizing, in a debugging pipeline between the cloud application computer code and a debugging tool located outside the cloud machine, a programming language agnostic protocol which supports debugging requests from a variety of computer languages;
utilizing, in a debugging pipeline between the cloud application computer code and a debugging tool located outside the cloud machine, a location protocol which allows locations in the computer code to be referenced during debugging without knowing an underlying debugee operation or explicit symbol;
utilizing, in a debugging pipeline between the cloud application computer code and a debugging tool located outside the cloud machine, a type-universe agnostic protocol which allows a data inspection debugging request to return requested data without exposing a data layout or data type;

filtering, in a debugging pipeline between the cloud application computer code and a debugging tool located outside the cloud machine, by using a filter which screens out a debug event;

filtering, in a debugging pipeline between the cloud application computer code and a debugging tool located outside the cloud machine, by using a filter which handles a conditional breakpoint;

filtering, in a debugging pipeline between the cloud application computer code and a debugging tool located outside the cloud machine, by using a filter which uses a private remoting protocol;

or filtering, in a debugging pipeline between the cloud application computer code and a debugging tool located outside the cloud machine, by using a filter which provides read-only access to one or more portions of the cloud application computer code.

16. The computer-readable device of claim 15, wherein the instructions perform acts which comprise at least three of the steps.

17. The computer-readable device of claim 15, wherein the instructions perform acts which comprise at least four of the steps.

18. The computer-readable device of claim 15, wherein the instructions perform acts which comprise at least five of the steps.

19. The computer-readable device of claim 15, the acts comprising implementing a type-universe agnostic architecture to facilitate the debugging.

20. The computer-readable device of claim 15, the acts comprising exposing the debugging pipeline to the debugging tool to facilitate the debugging, the debugging tool comprising at least one of a rich client, a browser, or a command line shell.

* * * * *